(12) United States Patent
Ghosh

(10) Patent No.: US 6,739,808 B1
(45) Date of Patent: May 25, 2004

(54) TOOL HOLDER

(75) Inventor: Ranajit Ghosh, Monroeville, PA (US)

(73) Assignee: Kennametal Inc., Latrobe, PA (US)

( * ) Notice: Subject to any disclaimer, the term of this patent is extended or adjusted under 35 U.S.C. 154(b) by 32 days.

(21) Appl. No.: 09/666,638

(22) Filed: Sep. 21, 2000

(51) Int. Cl.$^7$ .......................... B23P 15/30; B23P 15/28
(52) U.S. Cl. ...................... 407/114; 407/107
(58) Field of Search .................. 82/52; 407/6, 11, 407/29, 66, 67, 68, 69, 70, 91, 103, 107, 114, 115, 116; 30/481; 144/46, 48.1

(56) References Cited

U.S. PATENT DOCUMENTS

| | | | |
|---|---|---|---|
| 2,854,734 A | * 10/1958 | Beck | 407/107 |
| 2,955,349 A | * 10/1960 | YorK | 407/112 |
| 3,172,190 A | 3/1965 | Beach | |
| 3,484,920 A | 12/1969 | Wermer | |
| 3,518,737 A | 7/1970 | Hood | |
| 3,673,653 A | 7/1972 | Kaser | |
| 3,947,937 A | * 4/1976 | Hertel | 407/114 |
| 4,131,383 A | 12/1978 | Powers | |
| 4,220,427 A | 9/1980 | Kimura et al. | |
| 4,271,734 A | 6/1981 | Kimura et al. | |
| 4,277,206 A | 7/1981 | Hilton | |
| 4,400,116 A | 8/1983 | Buchmann et al. | 407/3 |
| 4,525,179 A | * 6/1985 | Gigl | 51/309 |
| 4,844,643 A | 7/1989 | Icks | |
| 4,848,198 A | 7/1989 | Royal et al. | 82/1.11 |
| 5,100,269 A | * 3/1992 | Lyon et al. | 407/107 |
| 5,148,728 A | * 9/1992 | Mazurkiewicz | 82/1.11 |
| 5,538,367 A | 7/1996 | Ashley et al. | |
| 5,569,000 A | * 10/1996 | Littecke et al. | 407/114 |
| 5,704,734 A | 1/1998 | Ashley et al. | 407/3 |
| 5,709,509 A | * 1/1998 | Wegener et al. | 407/114 |
| 5,829,927 A | 11/1998 | Nakamura et al. | |
| 5,947,651 A | * 9/1999 | Murakami et al. | 407/114 |
| 6,026,719 A | 2/2000 | Li | |
| 6,065,554 A | * 5/2000 | Taylor et al. | 175/430 |
| 6,106,585 A | * 8/2000 | Packer et al. | 51/309 |
| 6,167,958 B1 | * 1/2001 | Lynde | 166/55.6 |
| 6,170,368 B1 | * 1/2001 | Oles et al. | 407/115 |
| 6,186,705 B1 | * 2/2001 | Kumar et al. | 407/114 |
| 6,193,446 B1 | * 2/2001 | Astrom et al. | 407/114 |
| 6,290,436 B1 | * 9/2001 | Qvarth | 407/113 |
| 2001/0014259 A1 | * 8/2001 | Inayama | 407/116 |
| 2001/0037609 A1 | * 11/2001 | Jensen et al. | 51/293 |

FOREIGN PATENT DOCUMENTS

| | | |
|---|---|---|
| EP | 0143569 | 6/1985 |
| GB | 1260835 | 1/1972 |
| GB | 1286204 | 8/1972 |

OTHER PUBLICATIONS

Search Report from GB Patent Office, dated Dec. 7, 2001, in Related GB Patent Application No. GB 0118550.3, filed Jul. 30, 2001.

* cited by examiner

Primary Examiner—A. L. Wellington
Assistant Examiner—Brian D. Walsh
(74) Attorney, Agent, or Firm—Larry R. Meenan

(57) ABSTRACT

A tool holder that is adapted to break chips during a cutting operation is disclosed. The tool holder comprises a shank and a head. The shank is adapted to be received by a cutting machine. A head is provided with a pocket for receiving a cutting insert. The head has a flank surface. A chip breaker is provided on the flank surface adjacent the pocket. A clamp is provided for retaining the cutting insert in the pocket. A method for breaking chips comprises the steps of providing a chip breaker on the head of a tool holder adjacent a cutting insert and directing a chip into the chip breaker.

34 Claims, 9 Drawing Sheets

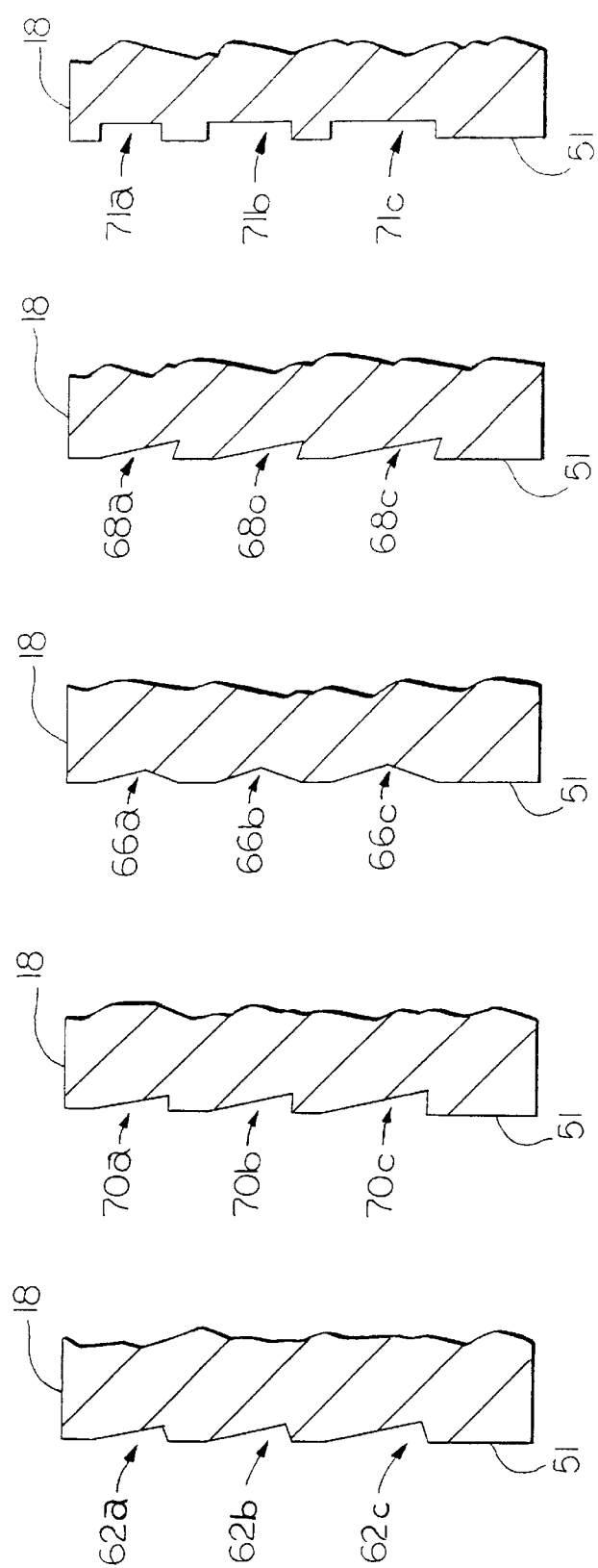

TOOL HOLDER

FIELD OF THE INVENTION

This invention generally relates to cutting tools and is specifically concerned with a tool holder that improves chip breaking during cutting operations.

BACKGROUND OF THE INVENTION

During metal cutting operations, continuous metal shavings are usually produced. These shavings are commonly referred to as chips. Chips can build up, cause deterioration in the finished surface of a work piece, and thus create a quality assurance problem. Build up chips can form a mass that may rotate with the work piece and thus pose problems relating to operational safety. Moreover, chips can cause unpredictable jams in a cutting process, which requires manual disposal of the chips. This ultimately interferes with the automated cutting operations.

To this end, it is strongly desirable to have the chips generated in discontinuous forms. Chip breakers have been devised for breaking chips into small pieces. One type of chip breaker includes a combination of grooves and obstacles formed on the rake face of the cutting insert. During cutting operations, the grooves and obstacles function to bend the chip after it has been produced. Often, the grooves and obstacles fail to break the chips.

There is a need for a tool holder that improves chip breaking. Ideally, the tool holder would control dispersion of the chips and thus, promote safety, quality assurance, and the automated cutting operations.

SUMMARY OF THE INVENTION

Generally speaking, the invention is directed towards a tool holder that is adapted to break chips during a cutting operation. The tool holder comprises a shank and a head. The shank is adapted to be received by a cutting machine. A head is provided with a pocket for receiving a cutting insert. The head has a flank surface. A chip breaker is provided on the flank surface adjacent the pocket. A clamp is provided for retaining the cutting insert in the pocket.

The invention is also directed to a method for breaking chips comprising the steps of providing a chip breaker on the head of a tool holder adjacent a cutting insert and directing a chip into the chip breaker.

BRIEF DESCRIPTION OF THE DRAWINGS

FIGS. 4A through 4E are enlarged-scale, partial, cross-sectional views of cutting tools with alternative groove patterns;

DETAILED DESCRIPTION OF THE INVENTION

Figure 1:
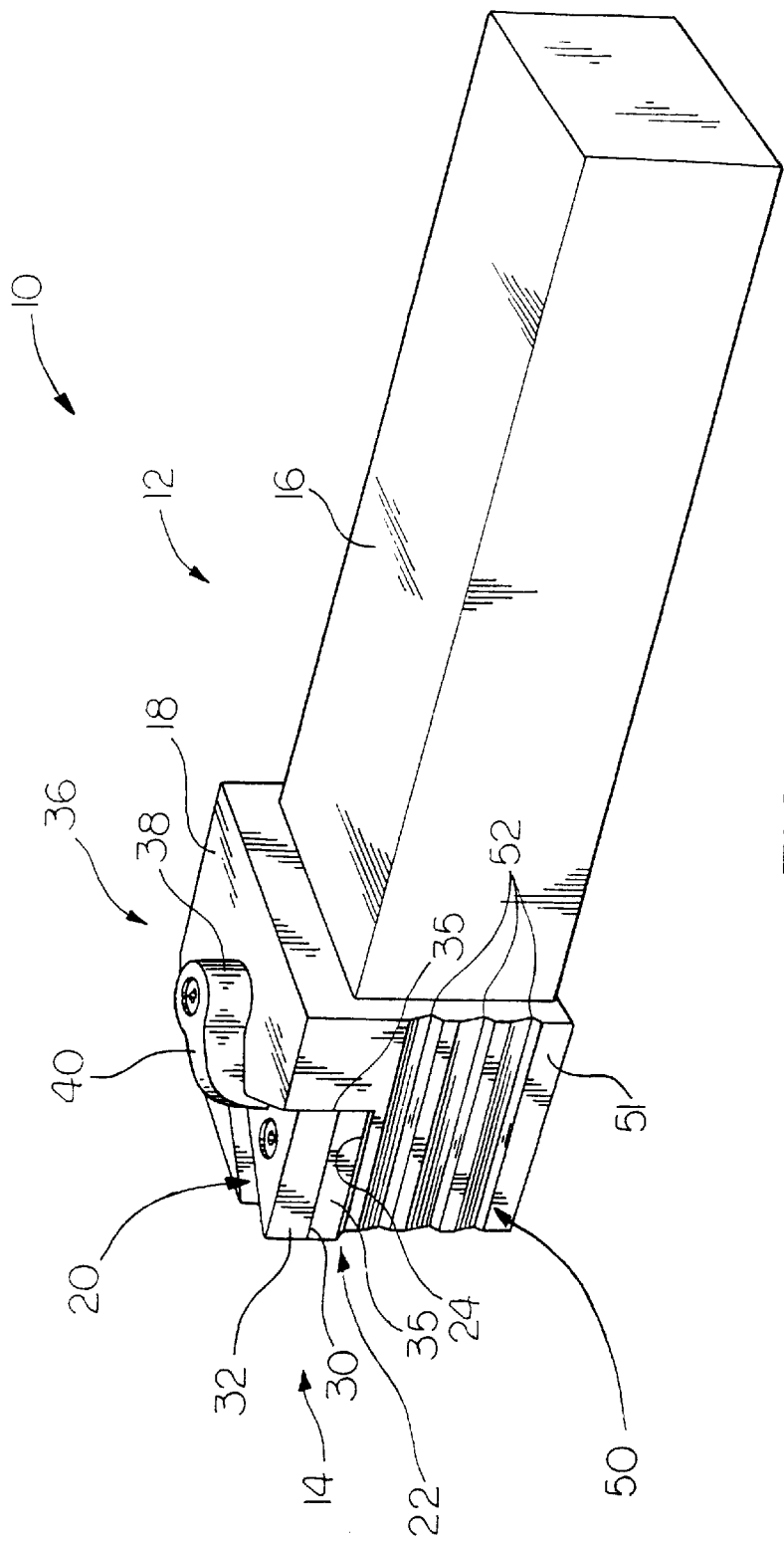
FIG. 1 is a perspective view of a cutting tool that includes a pattern of grooves according to the invention.
Figure 2:
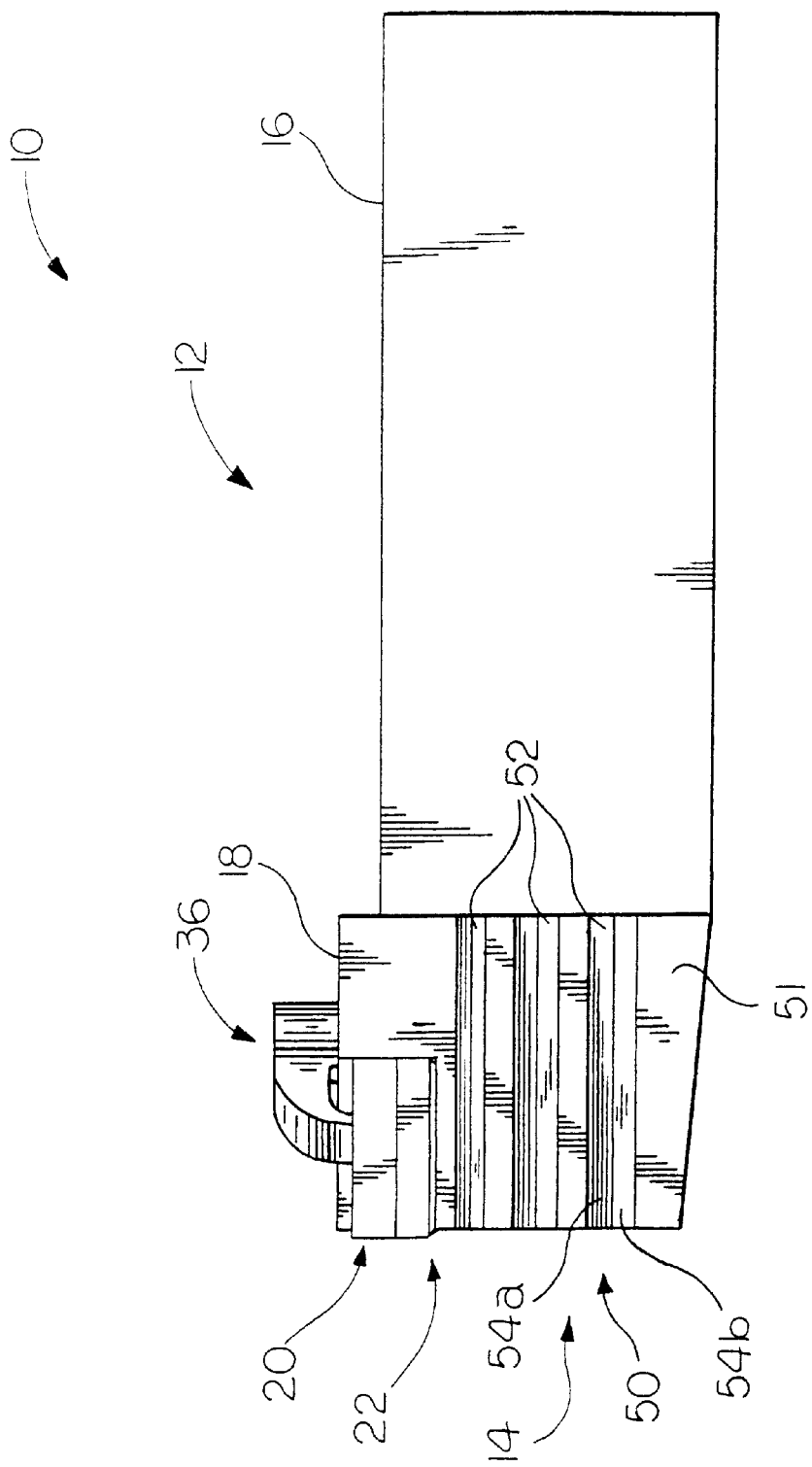
FIG. 2 is an enlarged-scale, elevational view of the cutting tool shown in FIG. 1.

With reference now to FIGS. 1 and 2, wherein like numerals designate like components throughout all of the several figures, the cutting tool is comprised of a tool holder 10 having a top, generally indicated at 12, and a front end, generally indicated at 14. The tool holder 10 is comprised of a unitary body including a shank portion 16 and a head portion head 18 joined to the shank 16. The shank 16 is adapted to be received by a tool magazine of a cutting machine, such as a lathe (not shown). The head 18 is adapted to receive a cutting insert 20.

The head 18 could be any desired shape. However, the shape of the shank 16 is generally dictated by the machine magazine (not shown). The cutting insert 20 can also be any desired shaped. The invention is not limited to the generally triangular-shaped cutting insert 20 shown but instead can be square, rectangular, or some other polygonal shape.

As shown in the drawings, the head 18 is provided with a pocket, generally indicated at 22, for receiving the cutting insert 20. The pocket 22 is preferably defined by a trihedral recess having a planar lower or bottom surface 24 and intersecting faces or side walls 26a, 26b (shown in FIG. 9).

The cutting insert 20 may be formed of tungsten carbide or the like. The cutting insert 20 shown is a unitary body including an upper face or rake 28 (shown in FIG. 9) and a lower face 30 joined by flank surfaces or sides 32. It is preferred that the cutting insert 20 be indexable. That is to say, each side 32 preferably defines a cutting edge. The cutting edges preferably intersect at their corners to provide a peripheral edge.

As shown in the drawings, the sides 32 of the cutting insert 20 match the configuration of the pocket 22 so that the cutting insert 20 cooperates with the pocket 22 so that one cutting edge extends at least slightly beyond the extent of the pocket 22 to engage a work piece.

A shim 35 can be provided between the lower face 30 of the cutting insert 20 and the bottom surface 24 of the pocket 22. The shim 35 can be provided for adjusting the height of various cutting inserts relative to the pocket 22.

Figure 9:
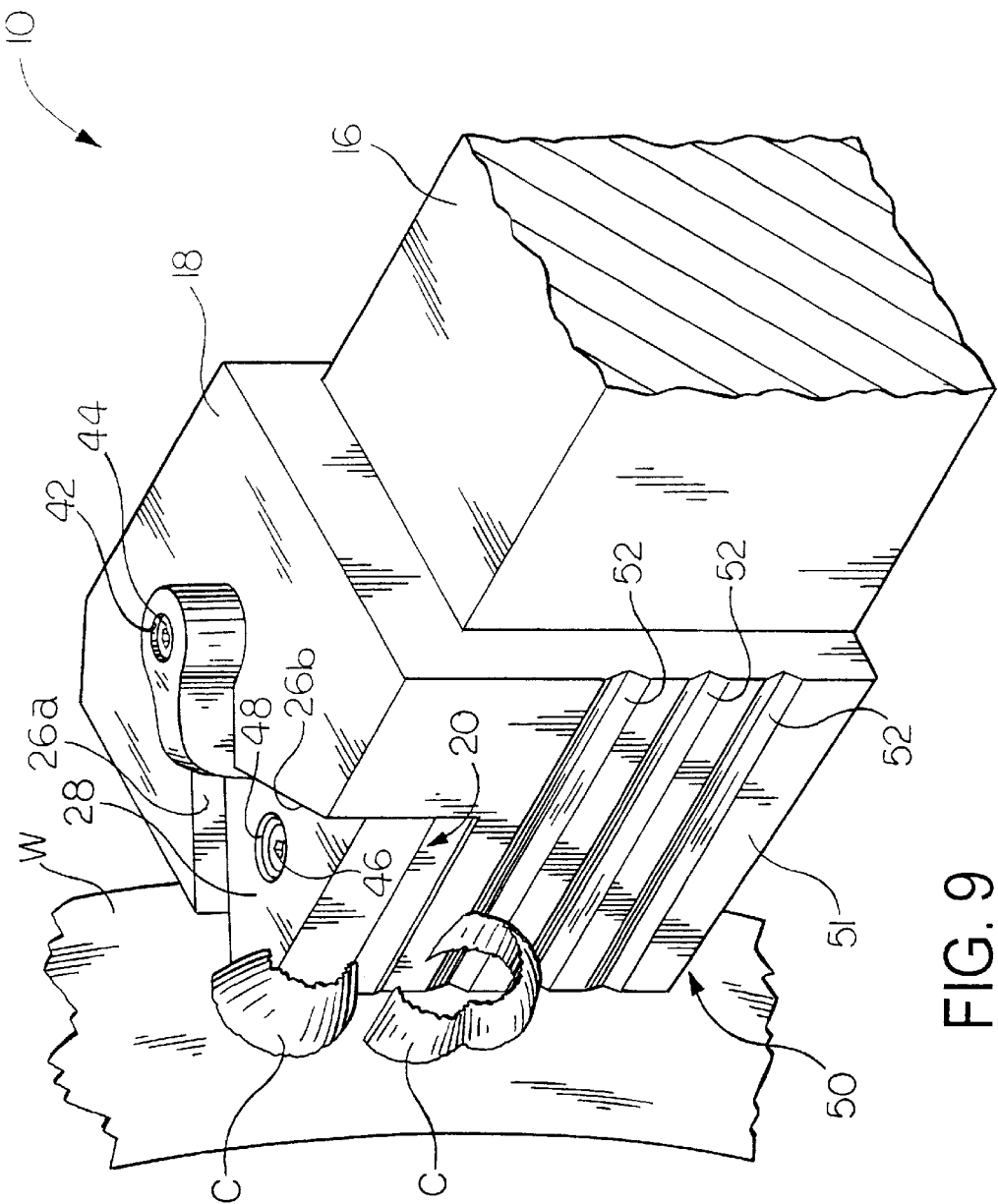
FIG. 9 is a partial, cross-sectional view of the cutting tool shown in operation.

As shown in the drawings, the cutting insert 20 is retained in the pocket 22 by a clamp 36. The clamp 36 may be any suitable configuration for retaining the cutting insert 20 in the pocket 22. The clamp 36 shown includes a first end 38 and a second end 40. The first end 38 is in the form of a sleeve that is adapted to be secured to the head 18 of the tool holder 10. This is preferably accomplished by providing the head 18 with a threaded hole (not shown) which is adapted to align with a passage 42 (shown in FIG. 9) in the first end 38 of the clamp 36. A screw, such as the hollow head screw 44 shown in FIG. 9, is adapted to pass through the passage 42 and threadably engage the threaded hole in the head 18.

The second end 40 is in the form of a leg or claw. The screw 44 can be loosened to permit the second end 40 of the clamp 36 to be free to pivot over the cutting insert 20 or out of its way. With the second end 40 of the clamp 36 over the cutting insert 20, the screw 44 can be tightened to urge the second end 40 into contact with at least a portion of the cutting insert 20. This urges the lower face 30 of the cutting insert 20 into contact with the bottom surface 24 of the pocket 22.

The head 18 may further be provided with a recess within which the clamp 36 can seat when the second end 40 of the clamp 36 is in tight contact with the cutting insert 20. This is to reduce the risk of the clamp 36 moving when in tight contact with the cutting insert 20. If such a recess is provided, it is preferred that the pocket be deeper than the clamp recess.

It is also preferred that the head 18 be provided with an aperture (not shown) into which a dowel rod or locator pin 46 (shown in FIG. 9) is press fit. The pin 46 is adapted to be received by an opening 48 (also shown in FIG. 9) in the cutting insert 20. It is preferred that the opening 48 be provided in the center of an indexable cutting insert to permit the cutting insert to be rotated to expose a new cutting edge. The pin 46 is provided to prevent the cutting insert 20 from moving, for example, in a lateral direction, out of the pocket 22.

In accordance with the present invention, the head 18 is further provided with a chip breaker, as generally indicated at 50. In the drawings, the chip breaker 50 is provided on a face or flank surface 51 of the head 18 below or adjacent the pocket 22. A flank surface 51 is provided on opposing sides of the head 18. The chip breaker 51 may be provided on one or both flank surfaces. One chip breaker 51 is suitable for turning operations and other chip breaker 51 is suitable for facing operations.

In FIGS. 1 and 2, the chip breaker 50 is comprised of a plurality of generally parallel V-shaped grooves 52. The grooves 52 extend substantially parallel relative to the central axis of the shank 16. The grooves 52 are spaced substantially equidistantly apart from the pocket 22 and from each other.

The grooves 52 are formed by two surfaces 54a, 54b. A first surface 54a extends inwardly and downwardly relative to the flank surface 51 of the head 18 at an obtuse angle relative to the flank surface 51. A second surface 54b extends inwardly and upwardly relative to the flank surface 51 at an obtuse angle relative to the flank surface 51. The first surface 54a has a greater depth than the second surface 54b and the two surfaces 54a, 54b intersect at an included angle that is between about 70 and 80 degrees.

Figure 3B:
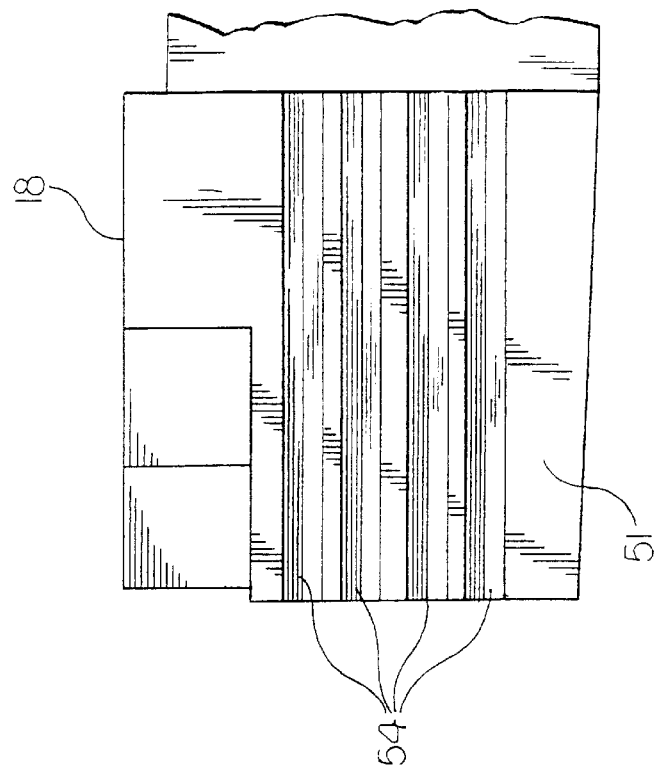
FIGS. 3A through 3E are enlarged-scale, elevational views of cutting tools with alternative groove patterns.
Figure 3A:
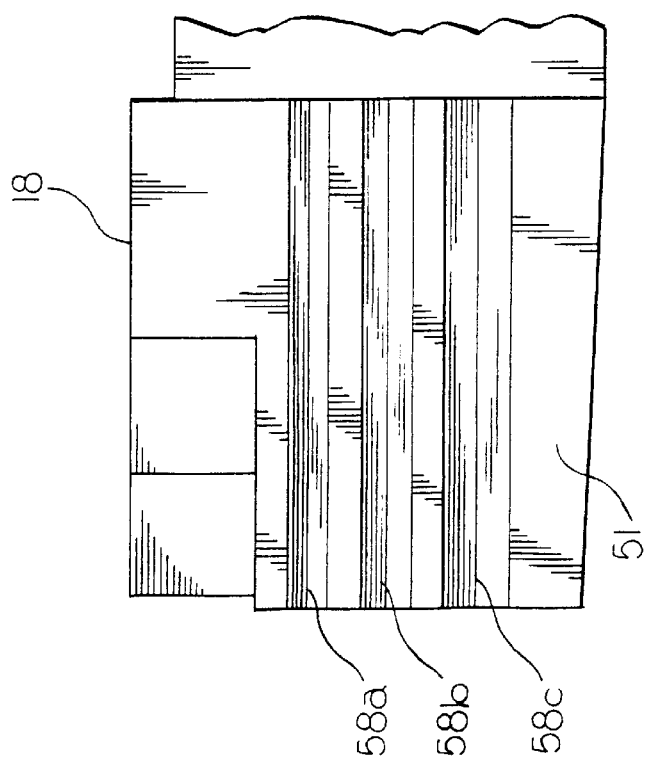
Figure 3D:
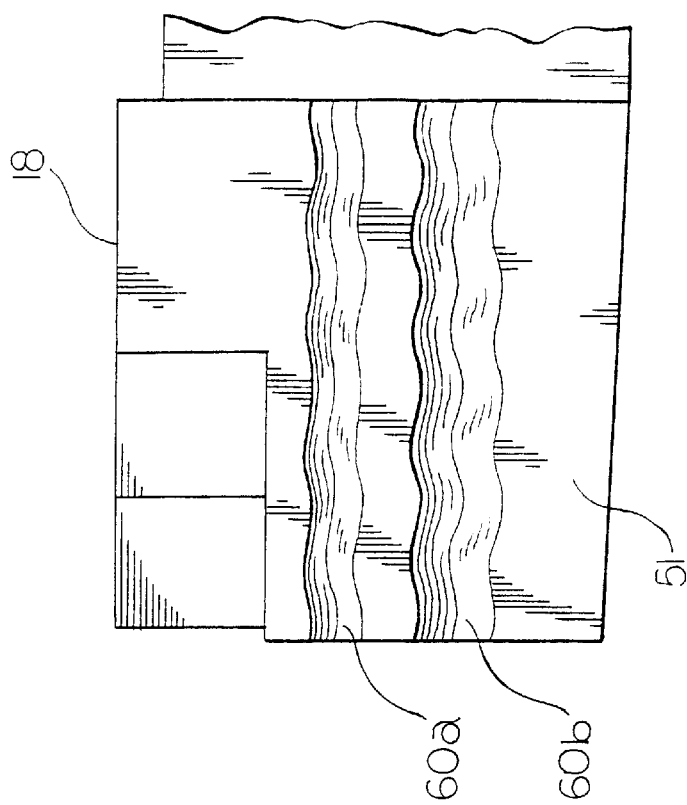
Figure 3C:
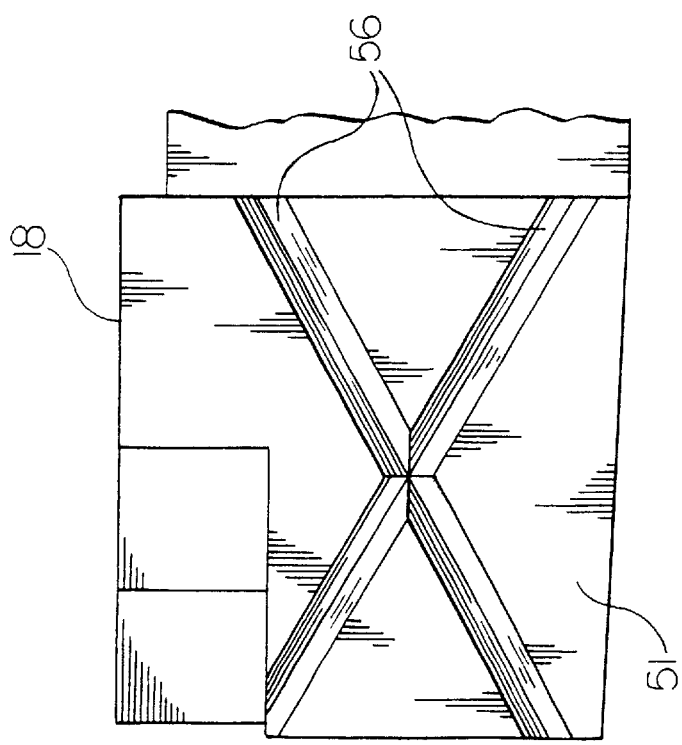
Figure 3E:
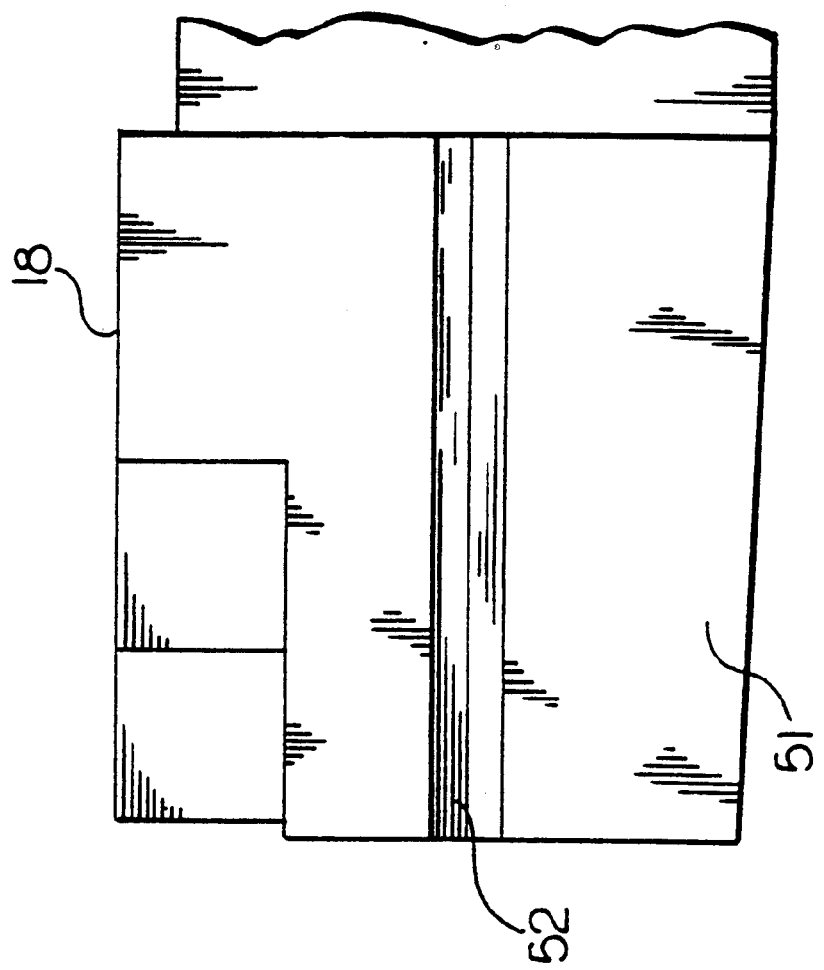

It should be understood that the grooves 52 could be any suitable shape. However, the shape may be dictated by certain factors, such as the composition of the work piece, and the feed rate of the work piece, and the depth or width of a cut. Examples of alternative groove patterns are shown in FIGS. 3A through 3E. It should be understood that any number of grooves (including a single groove, as shown in FIG. 3E) could be provided on the flank surface 51 of the head 18. The distance between grooves can be the same or different. Moreover, grooves need not be arranged parallel to one another. For example, grooves 56 may extend transversely relative to one another, as shown in FIG. 3C.

Grooves may be substantially the same width. Identical width grooves 54, 56 are shown, for example, in FIGS. 3B and 3C. Alternatively, the widths of grooves can be different relative to one another. Different width grooves 58a, 58b, 58c and 60a, 60b are shown, for example, in FIGS. 3A and 3D, respectively.

Grooves that differ in width are also illustrated in FIGS. 4A through 4E. It should be noted that the width of each groove in FIGS. 4A through 4E increases from the upper groove to the lower groove. However, other groove patterns may be suitable for carrying out the invention.

Grooves may be linear or non-linear in shape. Linear shaped grooves 54, 56, 58a, 58b, 58c are shown in FIGS. 3A through 3C. Non-linear grooves 60a, 60b are shown, for example, in FIG. 3D.

The cross-sectional shape of the grooves may differ. For example, grooves 62a, 62b, 62c, as shown in FIG. 4A, may be defined by surfaces that intersect at included angles between about 70 and 80 degrees. Such grooves 52 are also shown in FIGS. 1 and 2 and described above.

Grooves 70a, 70b, 70c may also be defined at least in part by surfaces that intersect the flank surface 51 of the head 18 at an angle that is substantially 90 degrees, as shown in FIG. 4B. Another example of grooves 71a, 71b, 71c defined by surfaces that intersect the flank surface 51 of the head 18 at an angle that is substantially 90 degrees is shown in FIG. 4E. The grooves 71a, 71b, 71c in FIG. 4E are also defined by three surfaces (shown but not referenced) as opposed to the two surfaces defining the grooves 62a, 62b, 62c and 70a, 70b, 70c in FIGS. 4A and 4B. FIGS. 4C and 4D are illustrative of grooves 66a, 66b, 66c and 68a, 68b, 68c that have other cross-sectional shapes than those referenced above.

Figure 6:
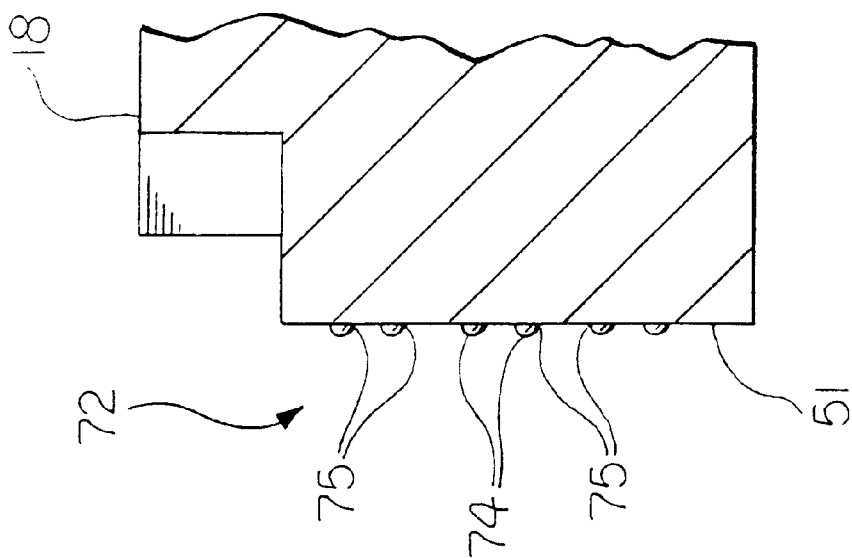
FIG. 6 is a partial, cross-sectional view of the cutting tool shown in FIG. 5.
Figure 5:
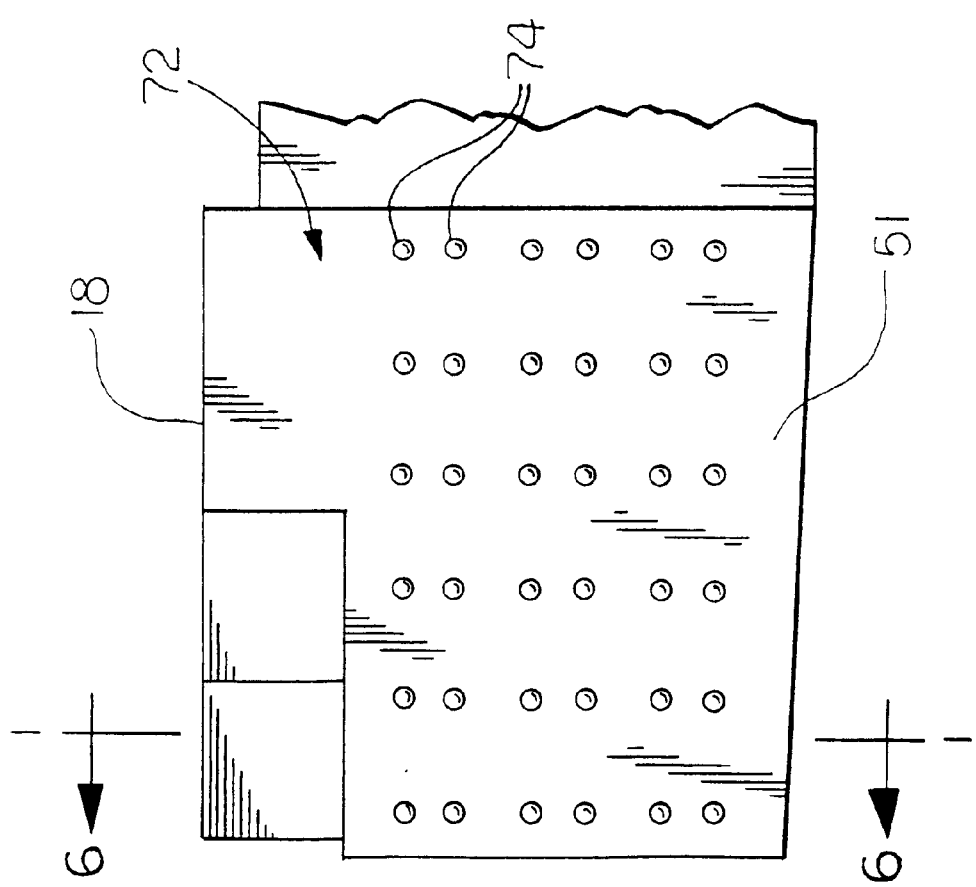
FIG. 5 is an enlarged-scale, elevational view of another cutting tool with a raised surface pattern.

An alternative chip breaker 72 is shown in FIGS. 5 and 6. This chip breaker 72 is comprised of a plurality of nodules or protrusions 74 extending outward from the flank surface 51 of the head 18, forming annular intersections 75 between the protrusions 74 and the flank surface 51. The instant invention is not limited to the pattern of protrusions 74 shown in the drawings. The protrusions 74 may take on other shapes than that shown in the drawings. Moreover, a single protrusion may be suitable for carrying out the invention.

Figure 8:
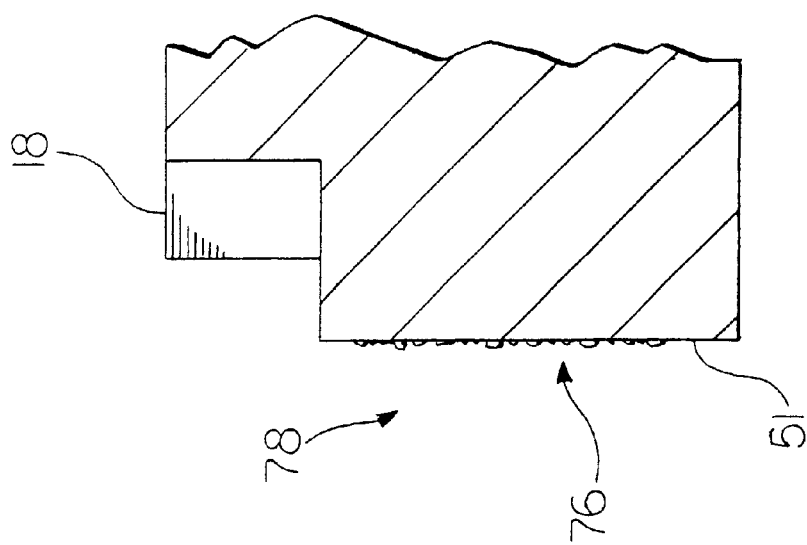
FIG. 8 is a partial, cross-sectional view of the cutting tool shown in FIG. 7.
Figure 7:
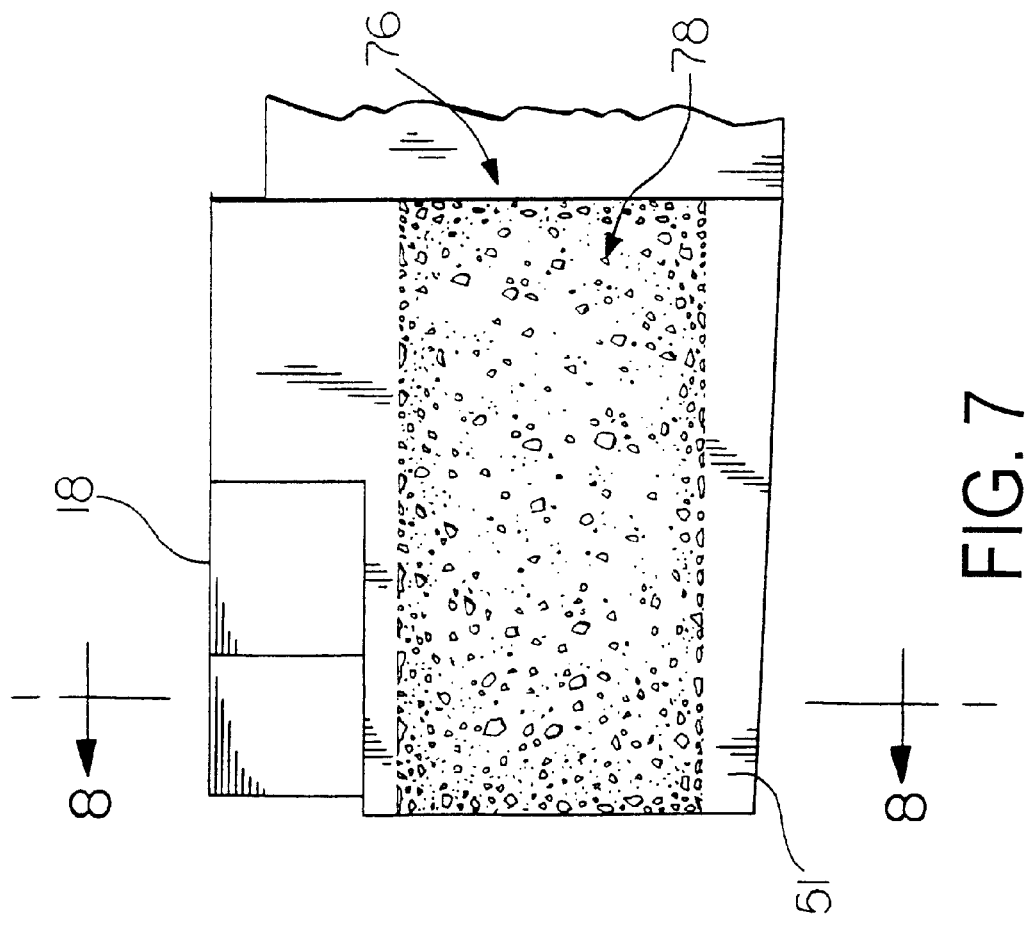
FIG. 7 is an enlarged-scale, elevational view of yet another cutting tool with a roughened surface.

Yet another chip breaker 76 is shown in FIGS. 7 and 8. The chip breaker 76 is comprised of a roughened surface, indicated generally at 78. The roughened surface 78 may be a knurled surface or the like cut into the flank surface 51 of the head 18. Alternatively, a grit material may be applied or formed on the flank surface 51.

The operation of the invention will be explained with reference to the embodiment shown in FIGS. 1 and 2. In operation, the tool holder 10 is received in the magazine of a machine (not shown) so that the cutting insert 20 engages a work piece W. Upon engaging the work piece W, the cutting insert 20 cuts into the work piece W, forming a continuous curled shaving or chip C. As the cutting insert 20 moves from left to right, the chip C curls to the left of the head 18. The design of the rake surface 28 of the cutting insert 20 imparts the curvature of the chip C in a desired direction. As the chip C engages a groove 52 in the chip breaker 50, tension increases in the chip C causing it to break. The other embodiments of the chip breaker shown in the other drawings operate in the same manner.

Due to the moment and dynamic motion of the chip C, a small amount of force is required to break the chip C. Hence, when the chip C engages a groove, a protrusion, or even a rough surface, and more particularly, an angle or point of intersection defined by the groove, protrusion, or rough surface, the contact force causes the chip C to break.

Although the curvature of the chip C may be directed as desired due to the design of the rake surface 28 of the cutting insert 20, the free end of the chip C randomly engages the flank surface 51 of the head 18. Hence, it may be desirable to produce as many angular points of intersection on the flank surface 51 as possible. The protrusions 74 (shown in FIGS. 5 and 6) may produce a greater number of intersections than a plurality of V-shaped grooves. Similarly, the roughened surface 78 (shown in FIGS. 7 and 8) may possess a greater number of intersections than the protrusions 74. For this reason, the roughened surface 78 may be a better chip breaking surface.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A tool holder that is adapted to break chips during a cutting operation, said tool holder comprising:

a shank adapted to be received by a cutting machine;

a head including a pocket and having a flank surface;

a chip breaker formed on said head flank surface below said pocket, said pocket being adapted to receive a cutting insert having a rake surface designed to impart curvature in the chip in a direction of the chip breaker; and a clamp for retaining said cutting insert in said pocket.

2. The tool holder of claim 1, wherein said chip breaker is defined by angular points of intersection on said flank surface of said head.

3. The tool holder of claim 1, wherein said chip breaker is comprised of a groove.

4. The tool holder of claim 3, wherein said groove is V-shaped.

5. The tool holder of claim 1, wherein said chip breaker is comprised of a plurality of grooves.

6. The tool holder of claim 5, wherein said grooves are V-shaped.

7. The tool holder of claim 5, wherein said grooves extend substantially parallel relative to one another.

8. The tool holder of claim 5, wherein said grooves extend transversely relative to one another.

9. The tool holder of claim 5, wherein said grooves have widths that are different relative to one another.

10. The tool holder of claim 5, wherein said grooves are non-linear in shape.

11. The tool holder of claim 5, wherein said grooves have cross-sectional shapes that differ relative to one another.

12. The tool holder of claim 1, wherein said chip breaker is comprised of a protrusion extending outward from said flank surface of said head forming an annular intersection between said protrusion and said flank surface.

13. The tool holder of claim 1, wherein said chip breaker is comprised of a plurality of protrusions extending outward from said flank surface of said head forming annular intersections between said protrusions and said flank surface.

14. The tool holder of claim 1, wherein said chip breaker is comprised of a roughened surface.

15. The tool holder of claim 14, wherein said roughened surface is defined by a knurled surface cut into said flank surface of said head.

16. The tool holder of claim 14, wherein said roughened surface is defined by a grit material on said flank surface.

17. A tool holder for breaking chips during a cutting operation, said tool holder comprising:

a shank adapted to be received by a cutting machine;

a head joined to said shank, said head including a pocket and having a flank surface;

a chip breaker formed on said head flank surface below said pocket;

a cutting insert received by said pocket, said cutting insert having sides that match the configuration of said pocket, said cutting insert further having a rake surface designed to impart curvature in the chip in a direction of said chip breaker; and a clamp adapted to be secured to said head, said clamp for retaining said cutting insert in said pocket.

18. A method for breaking chips comprising the steps of:

(a) providing a chip breaker integration the head of a tool holder below a cutting insert; and (b) directing a chip into the chip breaker.

19. A tool holder for holding a cutting insert, said tool holder adapted to break chips during a cutting operation, said tool holder comprising:

a shank and a head joined to the shank, said shank adapted to be received by a cutting machine;

said head including a pocket and a head flank surface;

wherein said head includes a chip breaker formed on said head flank surface below said pocket.

20. The tool holder of claim 19, wherein said chip breaker is defined by angular points of intersection on said flank surface of said head.

21. The tool holder of claim 19, wherein said chip breaker is comprised of a groove.

22. The tool holder of claim 21, wherein said groove is V-shaped.

23. The tool holder of claim 19, wherein said chip breaker is comprised of a plurality of grooves.

24. The tool holder of claim 23, wherein said grooves are V-shaped.

25. The tool holder of claim 23, wherein said grooves extend substantially parallel relative to one another.

26. The tool holder of claim 23, wherein said grooves extend transversely relative to one another.

27. The tool holder of claim 23, wherein said grooves have widths that are different relative to one another.

28. The tool holder of claim 23, wherein said grooves are non-linear in shape.

29. The tool holder of claim 23, wherein said grooves have cross-sectional shapes that differ relative to one another.

30. The tool holder of claim 19, wherein said chip breaker is comprised of a protrusion extending outward from said flank surface of said head forming an annular intersection between said protrusion and said flank surface.

31. The tool holder of claim 19, wherein said chip breaker is comprised of a plurality of protrusions extending outward from said flank surface of said head forming annular intersections between said protrusions and said flank surface.

32. The tool holder of claim 19, wherein said chip breaker is comprised of a roughened surface.

33. The tool holder of claim 32, wherein said roughened surface is defined by a knurled surface cut into said flank surface of said head.

34. The tool holder of claim 32, wherein said roughened surface is defined by a grit material on said flank surface.

* * * * *